(12) United States Patent
Piper et al.

(10) Patent No.: US 9,248,514 B2
(45) Date of Patent: Feb. 2, 2016

(54) ARBOR ASSEMBLY FOR USE WITH A CUTTING DEVICE, SUCH AS A CUTTER OR HOLE SAW

(71) Applicant: GREENLEE TEXTRON INC., Rockford, IL (US)

(72) Inventors: Arthur Piper, Loves Park, IL (US); Timothy Beed, Winnebago, IL (US)

(73) Assignee: Textron Innovations Inc., Providence, RI (US)

( * ) Notice: Subject to any disclaimer, the term of this patent is extended or adjusted under 35 U.S.C. 154(b) by 156 days.

(21) Appl. No.: 14/022,542

(22) Filed: Sep. 10, 2013

(65) Prior Publication Data

US 2015/0071721 A1    Mar. 12, 2015

(51) Int. Cl.
*B23B 51/04*    (2006.01)
*B23B 31/11*    (2006.01)

(52) U.S. Cl.
CPC ............. *B23B 51/0473* (2013.01); *B23B 31/11* (2013.01); *B23B 51/0426* (2013.01); *B23B 2251/606* (2013.01); *Y10T 408/895* (2015.01); *Y10T 408/95* (2015.01)

(58) Field of Classification Search
CPC ........... B23B 51/0473; B23B 51/0406; B23B 51/0453; B23B 31/11; B23B 31/113; B23B 2240/00; B23B 2240/04; Y10T 408/895; Y10T 408/94; Y10T 408/95
See application file for complete search history.

(56) References Cited

U.S. PATENT DOCUMENTS

| | | | | |
|---|---|---|---|---|
| 2,484,150 A | * | 10/1949 | Brown | 408/204 |
| 5,372,465 A | * | 12/1994 | Smith | 409/232 |
| 7,073,992 B2 | * | 7/2006 | Korb et al. | 408/204 |
| 7,488,146 B2 | * | 2/2009 | Brunson | 408/204 |
| 8,328,476 B2 | * | 12/2012 | O'Keefe et al. | 408/204 |
| 8,360,696 B2 | * | 1/2013 | O'Keefe et al. | 408/204 |
| 8,366,356 B2 | * | 2/2013 | Novak et al. | 408/204 |
| 2004/0057811 A1 | * | 3/2004 | Kelzer | 411/389 |
| 2009/0279972 A1 | | 11/2009 | Novak | |
| 2012/0009032 A1 | * | 1/2012 | Grussenmeyer | 408/204 |

FOREIGN PATENT DOCUMENTS

| | | |
|---|---|---|
| CN | 103 111 664 A | 5/2013 |
| DE | 20102516 U1 * | 8/2001 |
| DE | 102009034202 B3 * | 9/2010 |
| GB | 2 257 381 A | 1/1993 |
| GB | 2295110 A * | 5/1996 |
| GB | 2 325 188 A | 11/1998 |

OTHER PUBLICATIONS

European Search Report and Written Opinion for 14184013.2 dated Jan. 27, 2015, 8 pages.

* cited by examiner

*Primary Examiner* — Daniel Howell
(74) *Attorney, Agent, or Firm* — Klintworth & Rozenblat IP LLC (57) ABSTRACT

An assembly is provided for forming holes in a workpiece. The assembly includes an arbor, a pin sleeve and a cutting device. The arbor has a nose having at least one threaded portion and at least one unthreaded portions on an external surface thereof. The arbor also has at least one pin passageway extending therethrough. The pin sleeve has at least one pin extending from a main body. The arbor extends through the pin sleeve. The cutting device has a back plate and a plurality of teeth extending therefrom. The back plate has a passageway defined by a wall with at least one threaded portion and at least one unthreaded portion. The at least one threaded portion of the cutting device is capable of engaging with the at least one threaded portion of the nose, and the at least one pin of the pin sleeve is capable of engagement with the at least one pin passageway of the arbor to secure the components together.

21 Claims, 6 Drawing Sheets

ARBOR ASSEMBLY FOR USE WITH A CUTTING DEVICE, SUCH AS A CUTTER OR HOLE SAW

FIELD OF THE INVENTION

The present invention relates to an arbor assembly which allows a cutting device to be quickly mounted and dismounted therefrom.

BACKGROUND OF THE INVENTION

Cutting devices, such as cutters or hole saws, are commonly used in connection with electric drills to create holes in a workpiece, such as a stainless steel cabinet. It is often necessary to create holes of varying sizes and therefore is convenient to be able to quickly mount and dismount cutting devices of different sizes to and from an electric drill.

An assembly is provided herein which provides improvements to existing structures and which overcomes the disadvantages presented by the prior art. Other features and advantages will become apparent upon a reading of the attached specification, in combination with a study of the drawings.

SUMMARY OF THE INVENTION

An assembly is provided for forming holes in a workpiece. The assembly includes an arbor, a pin sleeve and a cutting device. The arbor has a nose having at least one threaded portion and at least one unthreaded portions on an external surface thereof. The arbor also has at least one pin passageway extending therethrough. The pin sleeve has at least one pin extending from a main body. The arbor extends through the pin sleeve. The cutting device has a back plate and a plurality of teeth extending therefrom. The back plate has a passageway defined by a wall with at least one threaded portion and at least one unthreaded portion. The at least one threaded portion of the cutting device is capable of engaging with the at least one threaded portion of the nose, and the at least one pin of the pin sleeve is capable of engagement with the at least one pin passageway of the arbor to secure the components together.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENTS

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

An arbor assembly 20 is provided for use with a cutting device 22, such as a cutter or a hole saw. The arbor assembly 20 allows for the quick mounting and dismounting of the cutting device 22 to and from the arbor assembly 20. The arbor assembly 20 provides an arbor 24 having a design with a special threaded geometry to allow for easy insertion of the arbor 24 into the cutting device 22. The cutting device 22 has a mating geometry that accommodates the arbor 24. The quick mounting and dismounting allows for easy use of varying sized cutting devices.

In describing the invention, use of the word "proximal" shall refer to elements, surfaces or positions closest to a user of the present invention and "distal" shall refer to elements, surfaces or positions furthest from a user of the present invention.

Figure 1:
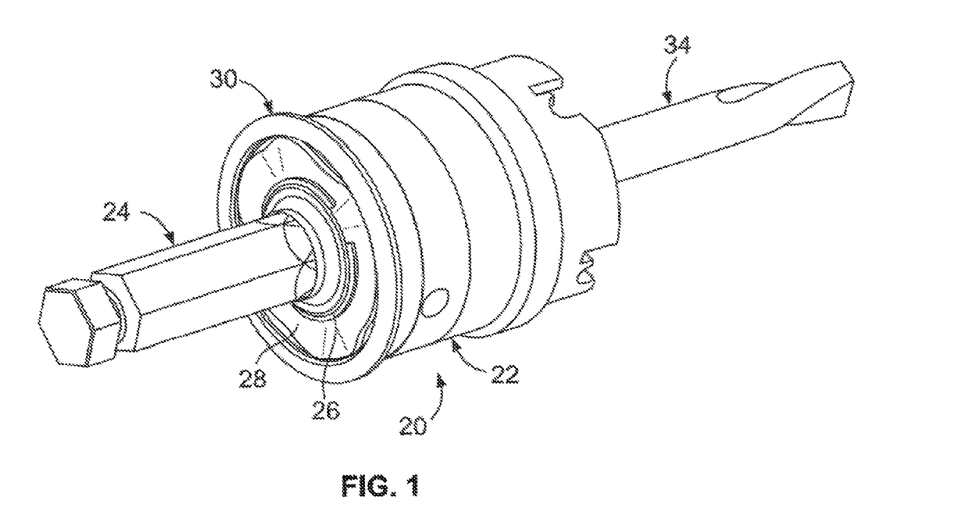
FIG. 1 is a perspective view of an arbor assembly connected to a cutting device which incorporates the features of the present invention.
Figure 2:
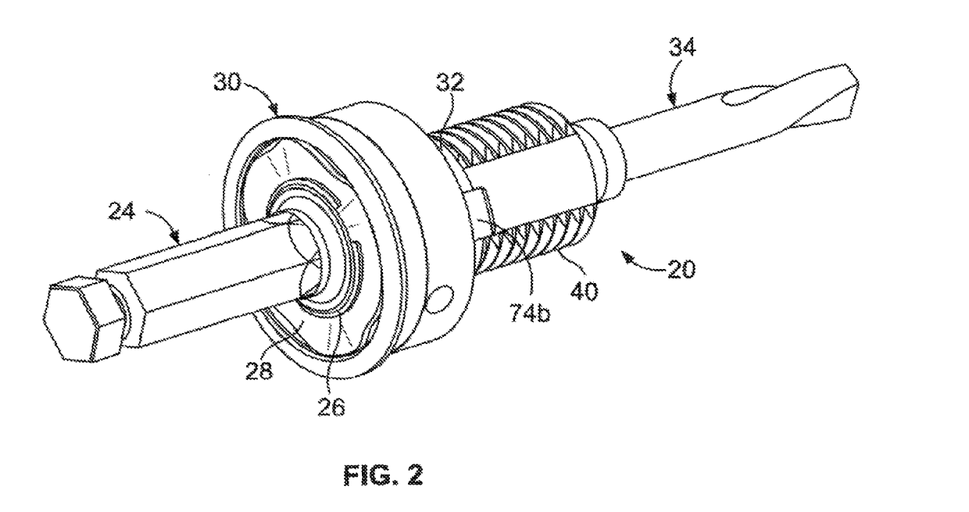
FIG. 2 is a perspective view of the arbor assembly.
Figure 3:
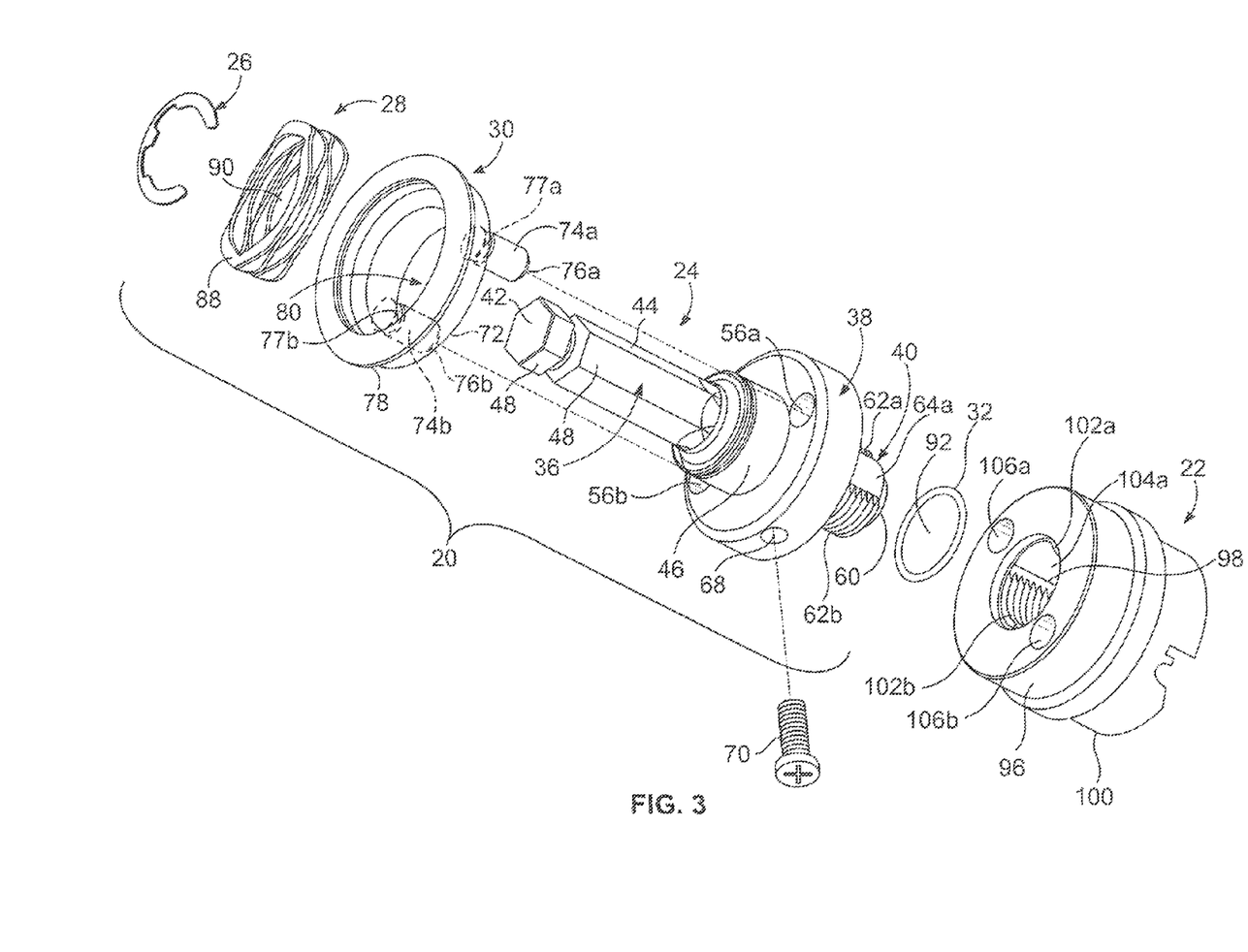
FIG. 3 an exploded perspective of the arbor assembly.

The arbor assembly 20 includes the arbor 24, a retainer 26, a spring 28 mounted on the arbor 24, a pin sleeve 30 and an optional O-ring 32. The arbor assembly 20 is shown with a pilot drill bit 34 mounted to the arbor 24 in FIGS. 1 and 2.

The arbor 24 is preferably made from metal, such as steel. The arbor 24 generally includes an elongated shank 36, a collar 38 and a nose 40. The shank 36 extends from a proximal end 42 of the arbor 24 to the collar 38. The collar 38 extends from the shank 36 to the nose 40 which defines a distal end 43 of the arbor 24. The shank 36 and the collar 38 receive the pin sleeve 30 as will be described herein.

Figure 6:
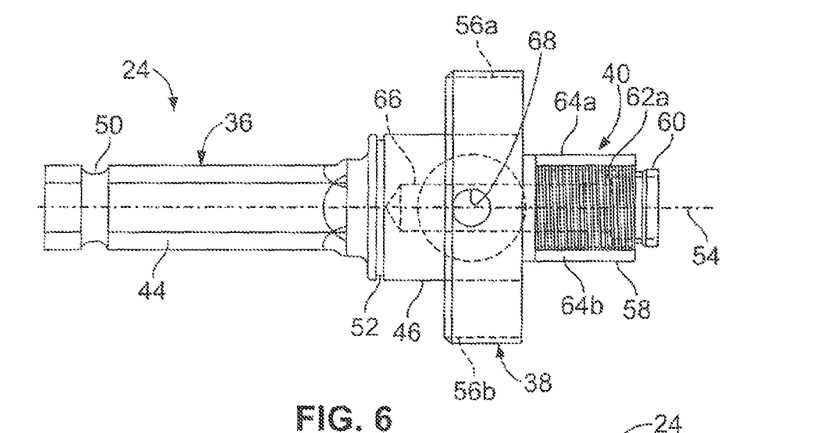
FIG. 6 is a side elevation view of the arbor.
Figure 7:
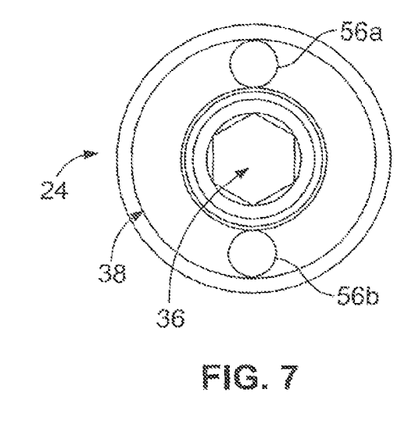
FIGS. 7 and 8 are end views of the arbor.
Figure 8:
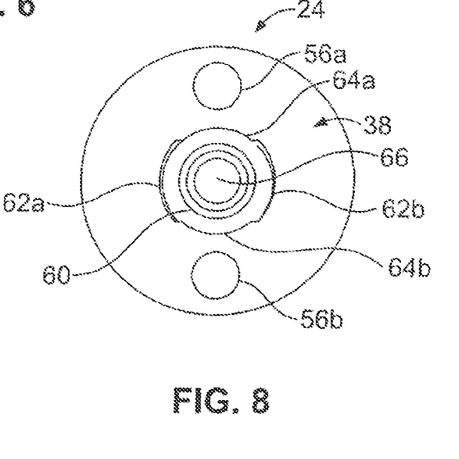
Figure 9:
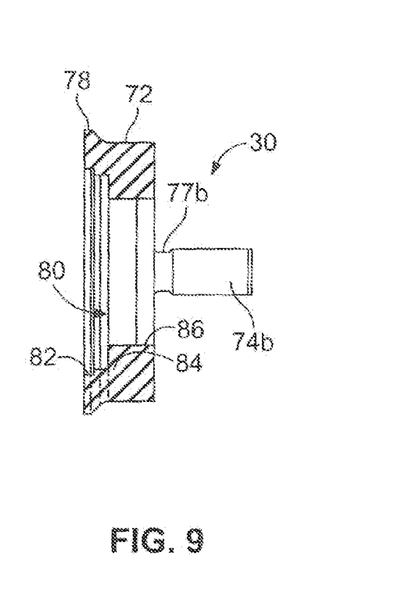
FIG. 9 is a cross-sectional view of a pin sleeve which forms part of the arbor assembly.
Figure 10:
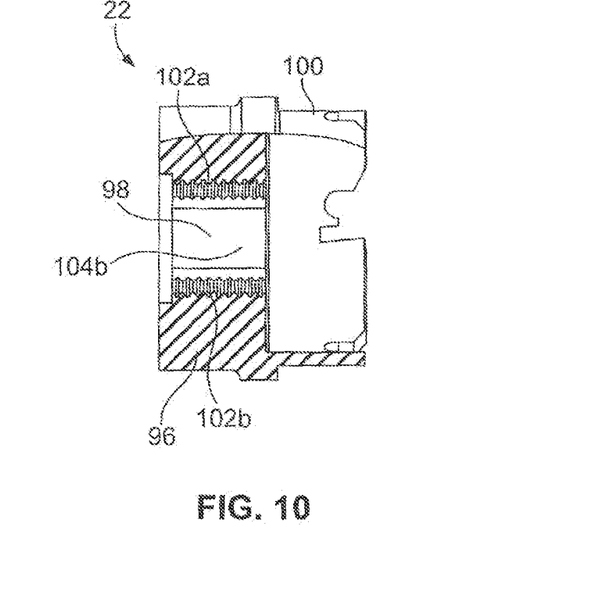
FIG. 10 is a cross-sectional view of the cutting device.
Figure 11:
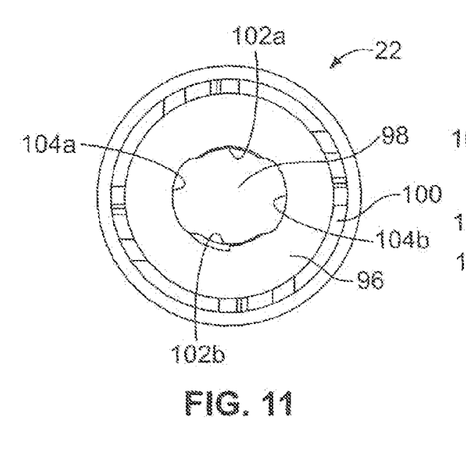
FIGS. 11 and 12 are end views of the cutting device.
Figure 12:
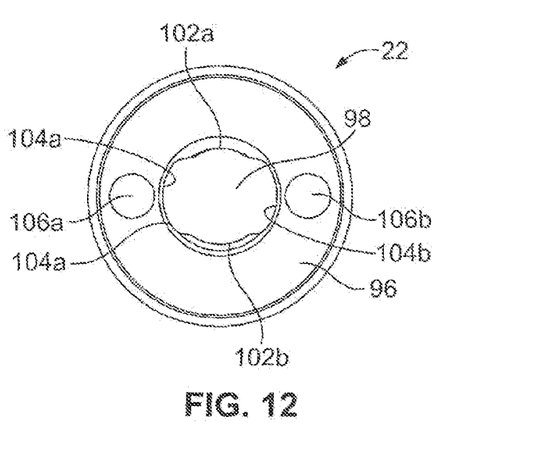

The shank 36 has a first elongated, generally cylindrical section 44 extending from the proximal end of the arbor 24 and a second cylindrical section 46 extending proximally from the first section 44 to the collar 38. The first section 44 includes surfaces 48, such as to form a hexagon, to be received by the chuck (not shown) of an electric drill (not shown) to provide rotation to the arbor assembly 20. A recess 50, see FIG. 6, can be provided in the first section 44 to further the connection to the drill in a known manner. The second section 46 has an outer diameter which is greater than the outer diameter of the first section 44 such that a shoulder is defined. A retainer recess 52, see FIG. 6, is provided in the second section 44 proximate to the proximal end thereof. A centerline 54 is defined extending from the proximal end 42 to the distal end 43 of the arbor 24.

The collar 38 is cylindrical and has an outer diameter which is greater than the second section of the shank 36. The collar 38 has a pair of through-holes 56a, 56b extending therethrough from the proximal end of the collar 38 to the distal end of the collar 38 and which are diametrically opposed to each other.

Figure 4:
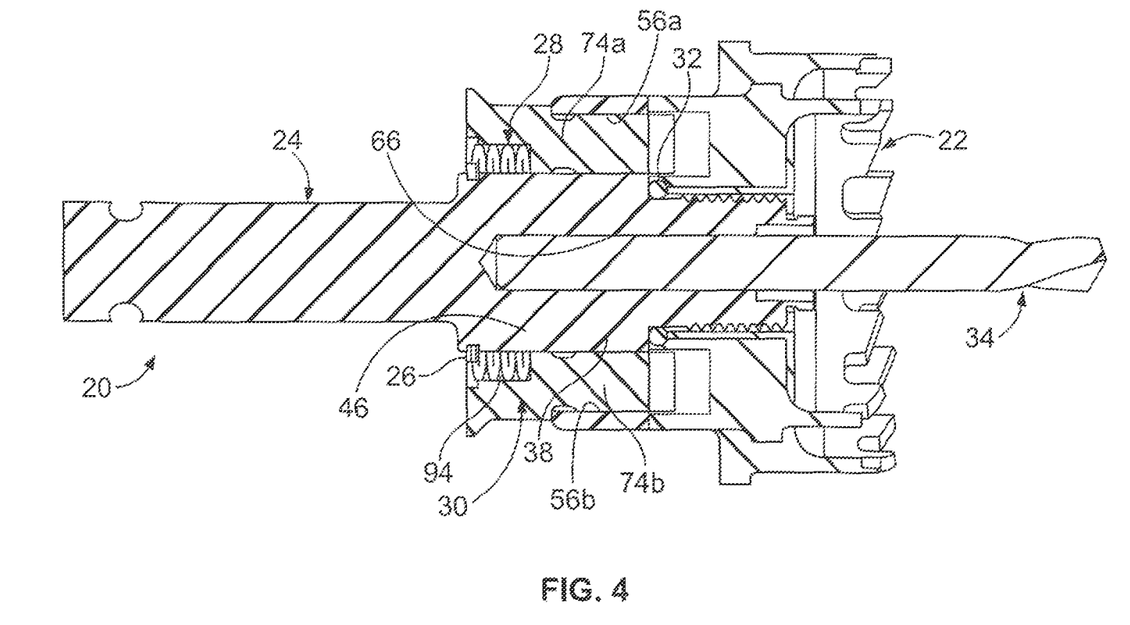
FIG. 4 is a cross-sectional view of the arbor assembly.
Figure 4A:
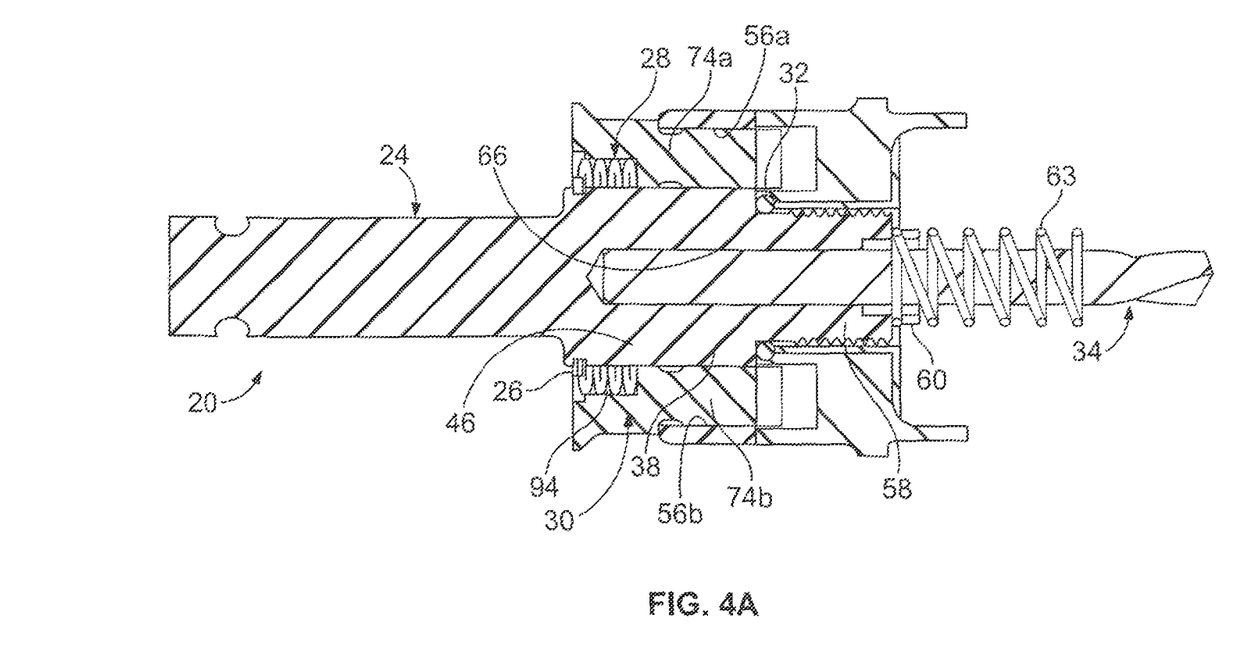
FIG. 4A is a cross-sectional view of the arbor assembly, with an optional spring shown therein.
Figure 5:
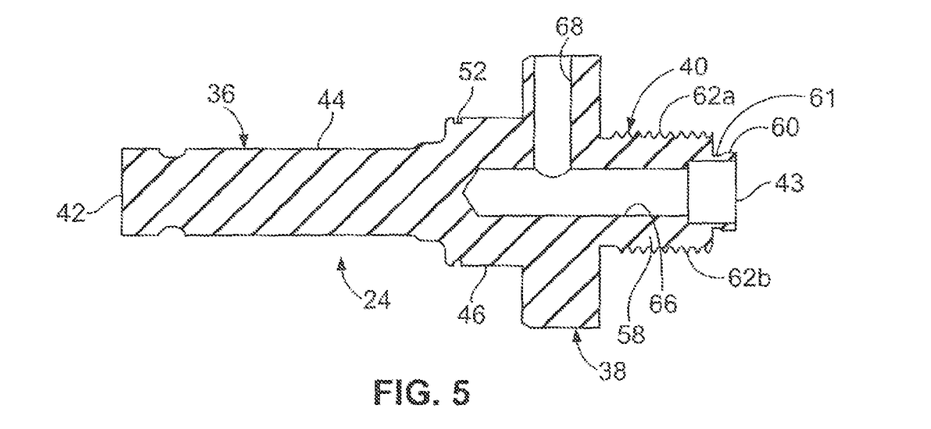
FIG. 5 is a cross-sectional view of an arbor which forms part of the arbor assembly.

The nose 40 extends distally from the collar 38 and forms the distal end of the arbor 24. The nose 40 is generally cylindrically-shaped has a first portion 58 which extends distally from the collar 38, and a second portion 60 which extends distally from the first portion 58. The second portion 60 has a diameter which is smaller than the first portion 58. The first portion 58 has a pair of diametrically opposed threaded portions 62a, 62b which alternate with unthreaded portions 64a, 64b on the external surface thereof. A recess 61, see FIG. 5, may be provided in the second portion 60 proximate to the first portion 58 to form a step. A removable spring 63, as shown in FIG. 4A, can be seated in the recess 61 and extends forwardly over the second portion 60 of the nose 60 and distally from the end of the second portion 60. The spring 63 can be used with a cutter head and is not used with a hole saw.

A drill bit passageway 66 extends from the distal end of the arbor 24, through the nose 40, through the collar 38 and into the second section 46 of the shank 36. A set screw passageway 68 extends through the collar 38, transverse to the drill bit passageway 66, and a set screw 70 inserted into the set screw passageway 68 to hold the drill bit 34 in place in a known manner.

The sleeve 30 is preferably made from metal, such as steel. The sleeve 30 includes a generally cylindrical main body 72 having a proximal end and a distal end, and a pair of cylindrical pins 74a, 74b extending from the distal surface of the main body 72. Each pin 74a, 74b terminates in an end 76a, 76b at its distal end, and has a relief 77a, 77b at its proximal end, formed as a recess extending around the circumference of the pin 74a, 74b. The proximal end of the main body 72 flares outwardly to form a gripping section 78. An arbor passageway 80 extends through the axial center of the sleeve 30 from the proximal end of the sleeve 30 to the distal end of the sleeve 30.

The arbor passageway 80 has a first section 82 which extends through the gripping section 78 of the main body 72, a second section 84 extending distally from the first section 82 and which extends through a portion of the gripping section 78 and a portion of the main body 72, and a third section 86 extending distally from the second section 84 and which extends through the main body 72 to the distal end of the main body 72. The diameter of the first section 82 is greater than the second section 84; the diameter of the second section 84 is greater than the third section 86. The diameter of the third section 86 is approximately equal to the outer diameter of the second portion 46 of the shank 36. The pins 74a, 74b extend from the distal end on diametrically opposed sides of the third section 86 of the arbor passageway 80; the pins 74a, 74b are spaced from the arbor passageway 80.

The spring 28 has a plurality of coils 88 which form a central passageway 90. The spring 28 is preferably formed of spring steel.

The O-ring 32, if provided, is formed of a ring of compressible material, such as plastic or rubber. The O-ring 32 has a central passageway 92.

Assembly of the arbor assembly 20 begins by mounting the pin sleeve 30 on the shank 36 of the arbor 24. The second section 46 of the shank 36 seats in the arbor passageway 80 of the pin sleeve 30. As a result, a space 94 is formed between the shank 36 and the wall forming the arbor passageway 80. The proximal end of the collar 38 seats against the distal surface of the main body 72 of the pin sleeve 30 and the pins 74a, 74b pass through the through-holes 56a, 56b in the collar 38 and extend outwardly from the distal end of the collar 38. The proximal end of the second section 46 of the shank 36 generally aligns with the proximal end of the pin sleeve 30. The spring 28 is passed over the shank 36 of the arbor 24 until the spring 28 surrounds the second section 46 of the shank 36 and seats in the second section 82 of the arbor passageway 80. As shown in FIGS. 4 and 4A, the spring 28 fills the space 94 between the arbor 24 and the pin sleeve 30. The retainer 26 is mounted in the recess 52 to secure the spring 28 to the arbor 24 and to the pin sleeve 30. The retainer 26 is preferably formed of metal and may be formed as a snap-ring or any other suitable form; the retainer 26 can be used without the recess 52, for example, the retainer 26 can bite into the shank 36 to secure the retainer 26 to the shank 36. The nose 40 of the arbor 24 is passed through the central passageway 92 of the 0-ring 32, if provided, until the 0-ring 32 abuts against the distal end of the collar 38.

The pin sleeve 30 can move toward the proximal end of the arbor assembly 20, axially along the centerline of the arbor assembly 20 (which aligns with the centerline 54 of the arbor 24), but cannot disengage from the arbor 24 as a result of being secured to the arbor 24 by the spring 28 and its retainer 26. To move the pin sleeve 30 axially toward the proximal end, the user grasps the gripping section 78 of the pin sleeve 30 and pulls the pin sleeve 30 proximally. This causes the spring 28 to compress and the pins 74a, 74b to retract into the through-holes 56a, 56b in the collar 38. The pin sleeve 30 cannot be moved so far proximally along the shank 36 to completely disengage the pins 74a, 74b from the through-holes 56a, 56b as a result of the geometry of the components. When the pulling force is released, the spring 28 returns to its naturally expanded state causing the pins 74a, 74b to extend outwardly from the distal end of the collar 38.

The cutting device 22 has a circular back plate 96 having a central through hole 98 therethrough and a plurality of teeth 100 that extend distally from the back plate 96. The through hole 98 has a mating geometry to that of the nose 40 of the arbor 24. As such, the through hole 98 is generally cylindrically-shaped and has a pair of diametrically opposed threaded wall portions 102a, 102b which alternate with unthreaded wall portions 104a, 104b. Two diametrically opposed blind pin mounting recesses 106a, 106b extend into the back plate 96 and are spaced from the through hole 98.

The pilot drill bit 34 is attached to the arbor assembly 20 by inserting the pilot drill bit 34 into the pilot bit passageway 66 in the shank 36. The set screw 70 is threaded through the set screw passageway 68 and the end of the set screw 70 engages the pilot drill bit 34 to secure the pilot drill bit 34 to the arbor assembly 20 in a known manner.

The cutting device 22 is attached to the arbor 24 of the arbor assembly 20 by passing the nose 40 of the arbor 24 through the aperture in the back plate 96 of the cutting device 22. The threaded portions 62a, 62b of the nose 40 of the arbor 24 are aligned with the unthreaded portions 104a, 104b of the back plate 96 of the cutting device 22, and the unthreaded portions 64a, 64b of the nose 40 of the arbor 24 are aligned with the threaded portions 102a, 102b of the back plate 96 of the cutting device 22. This enables the nose 40 of the arbor 24 to easily slide into the through hole 98 of the cutting device 22. When the cutting device 22 is being attached to the arbor assembly 20, the pins 74a, 74b on the arbor 24 are offset 90 degrees from the pin mounting recesses 106a, 106b in the back plate 96 of the cutting device 22. When the back plate 96 engages the ends 76a, 76b of the pins 74a, 74b, the arbor 24 is moved axially toward the proximal end 42 of the arbor assembly 20. This causes the spring 28 to compress and the pins 74a, 74b to retract into the through-holes 56a, 56b in the collar 38. The pin sleeve 30 cannot be moved so far proximally along the shank 36 to completely disengage the pins 74a, 74b from the through-holes 56a, 56b as a result of the geometry of the components.

Once the nose 40 is substantially inserted (a minimal clearance may be provided), the cutting device 22 is rotated 90 degrees thereby engaging the threaded portions 62a, 62b of the nose 40 of the arbor 24 with the mating threaded portions 102a, 102b of the cutting device 22. This action also aligns the pins 74a, 74b on the arbor 24 with the pin mounting recesses 106a, 106b in the cutting device 22, which causes the spring 28 to return to its naturally expanded state, thereby causing the pins 74a, 74b to extend outwardly from the distal end of the collar 38 and engage into the pin mounting recesses 106a, 106b in the cutting device 22. This engagement of the pins 74a, 74b with the cutting device 22 prevents the rotation of the cutting device 22 relative to the arbor assembly 20. The pins 74a, 74b prevent the cutting device 22 from rotating during use and the mated threads in the threaded portions 62a, 62b, 102a, 102b prevent the cutting device 20 from coming off during use.

If the O-ring 32 is provided, the O-ring 32 is compressed between the cutting device 22 and the arbor 24.

In use, as the shank 36 is rotated by the drill, the pilot drill bit 34 is also rotated due to the retention of the pilot drill bit 34 within the shank 36. The hexagonally-shaped first section 44 of the arbor 24 transfers rotational force from the drill to the cutting device 22. The O-ring 32, if provided, aids in reducing vibrations as the cutting device 22 is rotated and advanced within the workpiece.

To disengage the cutting device 22 from the arbor assembly 20, the user grasps the gripping section 78 of the pin sleeve 30 and pulls the pin sleeve 30 proximally. This causes the spring 28 to compress and the pins 74a, 74b to retract from engagement with the cutting device 22 and into the through-holes 56a, 56b in the collar 38. While the pin sleeve 30 is held in this position, the cutting device 22 is rotated in the reverse direction 90 degrees thereby disengaging the threaded portions 62a, 62b of the nose 40 of the arbor 24 from the threaded portions 102a, 102b of the cutting device 22, once again aligning the threaded portions 62a, 62b of the nose 40 of the arbor 24 with the unthreaded portions 104a, 104b of the cutting device 22, and the unthreaded portions 64a, 64b of the nose 40 of the arbor 24 with the threaded portions 102a, 102b of the cutting device 22. Once rotated, the cutting device 22 is easily pulled off of the arbor assembly 20. Once the cutting device 22 is removed from the arbor assembly 20, the spring 28 returns to its naturally expanded state causing the pins 74a, 74b to extend outwardly from the distal end of the collar 38.

Another cutting device having a different tooth configuration can be easily attached to the arbor assembly 20 in the same manner. This provides a quick and easy changeover for different cutting devices.

If desired, a pilot hole can be created in the workpiece with the drill bit 34 attached to the arbor assembly 20 and without the cutting device 22 attached to the arbor assembly 20. After formation of the pilot hole, the cutting device 22 can be easily attached to the arbor assembly 20 as described herein.

While two pins 74a, 74b and their associated through-holes 56a, 56b in the collar 38 and the pin mounting recesses 106a, 106b in the cutting device 22 are shown and described, it is to be understood that one or more of these components can be provided to prevent the rotation of the cutting device 22 relative to the arbor assembly 20.

While a preferred embodiment of the present invention is shown and described, it is envisioned that those skilled in the art may devise various modifications of the present invention without departing from the spirit and scope of the appended claims.

What is claimed is:

1. An arbor assembly for use with an associated cutting device comprising:
   an arbor having an elongated shank having a proximal end and a distal end, a collar having proximal end and a distal end and extending from said distal end of said shank, and a nose having a proximal end and a distal end and extending from said distal end of said collar,
   said collar having a diameter larger than a diameter of said shank and a diameter of said nose, said collar having at least one pin passageway extending therethrough, and
   said nose defining a circumference on an external surface thereof and having at least one threaded portion and at least one unthreaded portion on the external surface thereof, the at least one threaded portion and the at least one unthreaded portion alternating around the circumference of the nose; and
   a pin sleeve having a passageway therethrough, said arbor extending through said passageway, said pin sleeve having a main body portion and at least one pin extending from said main body portion, the main body portion being positioned proximate to the proximal end of the collar and the at least one pin extending through the at least one pin passageway for engagement with at least one recess in the associated cutting device and capable of being withdrawn from the associated cutting device and into the at least one pin passageway.

2. The arbor assembly of claim 1, wherein said at least one threaded portion and at least one unthreaded portion comprises a pair of diametrically opposed threaded portions which alternate with unthreaded portions.

3. The arbor assembly of claim 1, wherein said shank of said arbor includes a recess and further comprising a retainer mounted in said recess in said shank, and a spring mounted on said arbor and engaged with said retainer, said spring seats within said passageway of said pin sleeve such that said spring is trapped between said retainer and said pin sleeve, the spring biasing the at least one pin through the at least one pin passageway.

4. The arbor assembly of claim 1, further comprising a drill bit passageway extending from said distal end of said nose proximally into said collar, and a set screw passageway extending through said collar, said set screw passageway being transverse to said drill bit passageway.

5. The arbor assembly of claim 1, wherein said at least one pin has a relief provided proximate to said connection with said main body portion.

6. The arbor assembly of claim 1, wherein two pins and two pin passageways are provided.

7. The arbor assembly of claim 1, further comprising an O-ring mounted around said nose.

8. The arbor assembly of claim 1, further comprising a spring mounted on said nose.

9. An arbor assembly for use with an associated cutting device comprising:
   an arbor having an elongated shank having a proximal end and a distal end, a collar having proximal end and a distal end and extending from said distal end of said shank, and a nose having a proximal end and a distal end and extending from said distal end of said collar,
   said collar having a diameter larger than a diameter of said shank and a diameter of said nose, said collar having a pair of pin passageways extending therethrough, and
   said nose defining a circumference on an external surface thereof and having a pair of diametrically opposed threaded portions which alternate with unthreaded portions on the external surface thereof;
   a pin sleeve having a passageway therethrough, said arbor extending through said passageway, said pin sleeve having a main body portion and a pair of pins extending from said main body portion, the main body portion being positioned proximate to the proximal end of the collar and the pins extending through the pin passageways for engagement with the associated cutting device and capable of being withdrawn from the associated cutting device and into the pin passageways;

a retainer mounted on said shank of said arbor;

a spring mounted on said arbor, said spring seats within said passageway of said pin sleeve such that said spring is trapped between said retainer and said pin sleeve, the spring biasing the pins through the pin passageways.

10. The arbor assembly of claim 9, wherein said shank of said arbor includes a recess in which the retainer mounted, said retainer engaged with said spring.

11. The arbor assembly of claim 9, further comprising a drill bit passageway extending from said distal end of said nose proximally into said collar, and a set screw passageway extending through said collar, said set screw passageway being transverse to said drill bit passageway.

12. An assembly comprising:
an arbor having an elongated shank having a proximal end and a distal end, a collar having proximal end and a distal end and extending from said distal end of said shank, and a nose having a proximal end and a distal end and extending from said distal end of said collar,
said collar having a diameter larger than a diameter of said shank and a diameter of said nose, said collar having at least one pin passageway extending therethrough, and
said nose defining a circumference on an external surface thereof and having at least one threaded portion and at least one unthreaded portion on the external surface thereof, the at least one threaded portion and the at least one unthreaded portion alternating around the circumference of the nose;
a pin sleeve having a passageway therethrough, said arbor extending through said passageway, said pin sleeve having a main body portion and at least one pin extending from said main body portion, the main body portion being positioned proximate to the proximal end of the collar and the at least one pin extending through the at least one pin passageway and capable of being withdrawn into the at least one pin passageway; and
a cutting device having a back plate and a plurality of teeth extending from said back plate, said back plate having a hole therethrough defining a wall with at least one threaded portion and at least one unthreaded portion, the back plate further having at least one recess which is spaced from the hole, and the at least one threaded portion of said cutting device being capable of engaging with said at least one unthreaded portion of said nose, wherein rotation of the cutting device relative to the arbor causes the at least one threaded portion of the nose to engage with the at least one threaded portion of the cutting device and causes the at least one pin on the pin sleeve to align with and engage with the at least one recess in the cutting device to assemble the cutting device, arbor and pin sleeve together.

13. The assembly of claim 12, wherein said at least one threaded portion and at least one unthreaded portion of said nose comprises a pair of diametrically opposed threaded portions which alternate with unthreaded portions, and said at least one threaded portion and at least one unthreaded portion of said cutting device comprises a pair of diametrically opposed threaded portions which alternate with unthreaded portions.

14. The assembly of claim 12, further comprising a retainer and a spring mounted on said arbor, said spring engaged with said retainer, said spring seating within said passageway of said pin sleeve such that said spring is trapped between said retainer and said pin sleeve.

15. The assembly of claim 12, further comprising
a drill bit passageway extending from said distal end of said nose proximally into said collar;
a drill bit seated in said drill bit passageway;
a set screw passageway extending through said collar, said set screw passageway being transverse to said drill bit passageway; and
a set screw seated in said set screw passageway, said set screw engaging said drill bit.

16. The assembly of claim 12, wherein said at least one pin has a relief provided proximate to said connection with said main body portion.

17. The assembly of claim 12, wherein two pins and two pin passageways are provided.

18. The arbor assembly of claim 1, wherein the at least one pin always aligns with the at least one unthreaded portion of the nose.

19. The arbor assembly of claim 9, wherein respective pins always aligns with respective unthreaded portions of the nose.

20. The assembly of claim 12, wherein the at least one pin always aligns with the at least one unthreaded portion of the nose.

21. A method of assembly comprising:
providing an arbor having an elongated shank having a proximal end and a distal end, a collar having proximal end and a distal end and extending from the distal end of the shank, and a nose having a proximal end and a distal end and extending from the distal end of the collar, the collar having a diameter larger than a diameter of the shank and a diameter of the nose, the collar having at least one pin passageway extending therethrough, the nose defining a circumference on an external surface thereof and having at least one threaded portion and at least one unthreaded portion on the external surface thereof, the at least one threaded portion and the at least one unthreaded portion alternating around the circumference of the nose;
providing a pin sleeve having a passageway therethrough, the pin sleeve having a main body portion and at least one pin extending from the main body portion;
passing the arbor through the passageway of the pin sleeve until the main body portion is positioned proximate to the proximal end of the collar, and the at least one pin extends through the at least one pin passageway;
withdrawing the at least one pin into the at least one pin passageway;
providing a cutting device having a back plate and a plurality of teeth extending from the back plate, the back plate having a passageway therethrough defining a wall with at least one threaded portion and at least one unthreaded portion, and at least one recess therethrough which is spaced from the passageway;
passing the nose of the arbor through the passageway of the cutting device such that the back plate is proximate to the distal end of the collar and at least one threaded portion of the cutting device engages with the at least one unthreaded portion of the nose;
rotating the cutting device relative to the arbor, thereby engaging the at least one threaded portion of the nose with the at least one threaded portion of the cutting device and aligning the at least one pin on the pin sleeve with the at least one recess in the cutting device; and extending the at least one pin into the at least one recess of the cutting device.

\* \* \* \* \*